J. HAISH.
Wire-Fence.

No. 164,552.

Patented June 15, 1875.

Witnesses:
Frederick A. Herring
Silas E. Kelsey

Inventor:
Jacob Haish
By Gridley & Warner
Attys

UNITED STATES PATENT OFFICE.

JACOB HAISH, OF DE KALB, ILLINOIS.

IMPROVEMENT IN WIRE-FENCES.

Specification forming part of Letters Patent No. 164,552, dated June 15, 1875; application filed May 27, 1875.

*To all whom it may concern:*

Be it known that I, JACOB HAISH, of De Kalb, in the county of De Kalb and State of Illinois, have invented a new, useful and Improved Wire-Fence, of which the following is a full, clear, and exact description, which will enable others skilled in the art to which my invention appertains, to make and use the same, reference being had to the accompanying drawing, forming a part hereof, and in which—

Figure 1:
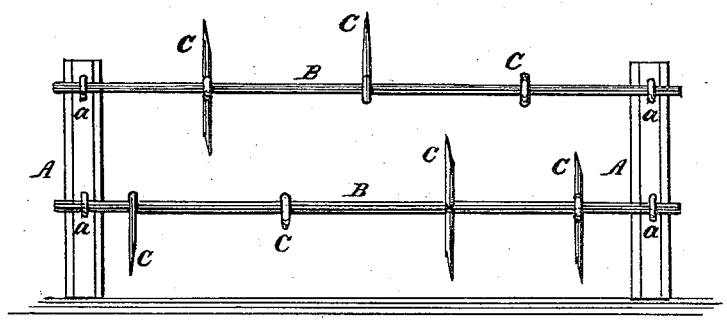
Figure 2:
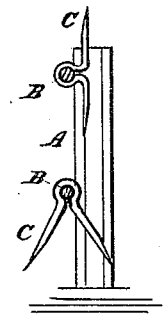
Figure 3:

Figure 1 represents a side elevation of my improved fence; Fig. 2, a cross-section thereof, and Fig. 3, a representation of the barb, detached, and formed for attachment to the wires of the fence.

Like letters of reference indicate like parts.

In the drawing, A A represent the posts of the fence, and *a a* are eyes or staples driven thereinto to support the wires. B B are single wires passing through and supported by the eyes or staples *a a*, and C C are barbs made of wires pointed at the ends, bent in the manner shown, and mounted at intervals on the wires B B. The points of the barbs C C project in various directions, so as to prevent cattle or other live stock from pressing and straining the wires of fence. The form into which the barbs are bent before being applied to the fence is clearly shown in Fig. 3, a central loop, *a'*, being made to receive the wires B B. When the barbs are applied to these wires the loops *a' a'* are pressed together firmly about them, as represented in Fig. 2, thus forming eyes through which the wires pass, and keeping the barbs firmly in place.

It will be perceived that the barbs are not convolute, although they inclose or partly inclose the wires of the fence. After the wires of the barbs are bent to form the loops or eyes *a' a'*, they are bent in the reverse direction, to set the points properly.

I am aware that wire-fences have heretofore been provided with barbs in various ways, and I do not here claim such broadly; but

What I claim as new is—

In a wire-fence, the combination of the single wires B B, and the pointed wires or barbs C C, bent into the loops or eyes *a' a'*, and mounted on the wires B B, substantially as and for the purposes specified.

JACOB HAISH.

Witnesses:
 N. C. GRIDLEY,
 F. F. WARNER.